(12) United States Patent
Crookston et al.

(10) Patent No.: US 7,030,370 B1
(45) Date of Patent: Apr. 18, 2006

(54) MICROCHIP RING TRAP FOR COLD ATOMS OR MOLECULES

(75) Inventors: Matthew Crookston, Rangely, CO (US); Michael Robinson, Groton, MA (US); Paul Baker, Leominster, MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 11/070,404

(22) Filed: Feb. 22, 2005

(51) Int. Cl.
*H05H 3/00* (2006.01)
*G01V 7/04* (2006.01)

(52) U.S. Cl. .................. 250/251; 356/460; 356/459

(58) Field of Classification Search ............ None
See application file for complete search history.

(56) References Cited

U.S. PATENT DOCUMENTS 4,874,942 A * 10/1989 Clauser ............... 250/251
6,937,342 B1 * 8/2005 Osinski et al. ......... 356/461

* cited by examiner

*Primary Examiner*—Nikita Wells
(74) *Attorney, Agent, or Firm*—William G. Auton

(57) ABSTRACT

A microchip ring trap for cold atoms or neutral molecules consists of a particular multi-layer layout of wires on a microchip. These conductive wires may be produced by photolithography on a substrate (e.g. gold on sapphire). There are four wires crucial to the design, essentially a pair of "two-wire waveguides". These wires are laid out on concentric circles with the inner and outer most wires on lower level of the chip, and the middle pair of wires on the top layer (the chip surface).

6 Claims, 2 Drawing Sheets

Top veiw schematic of the chip.

Cross-section of 4-wire layout

Top veiw schematic of the chip.

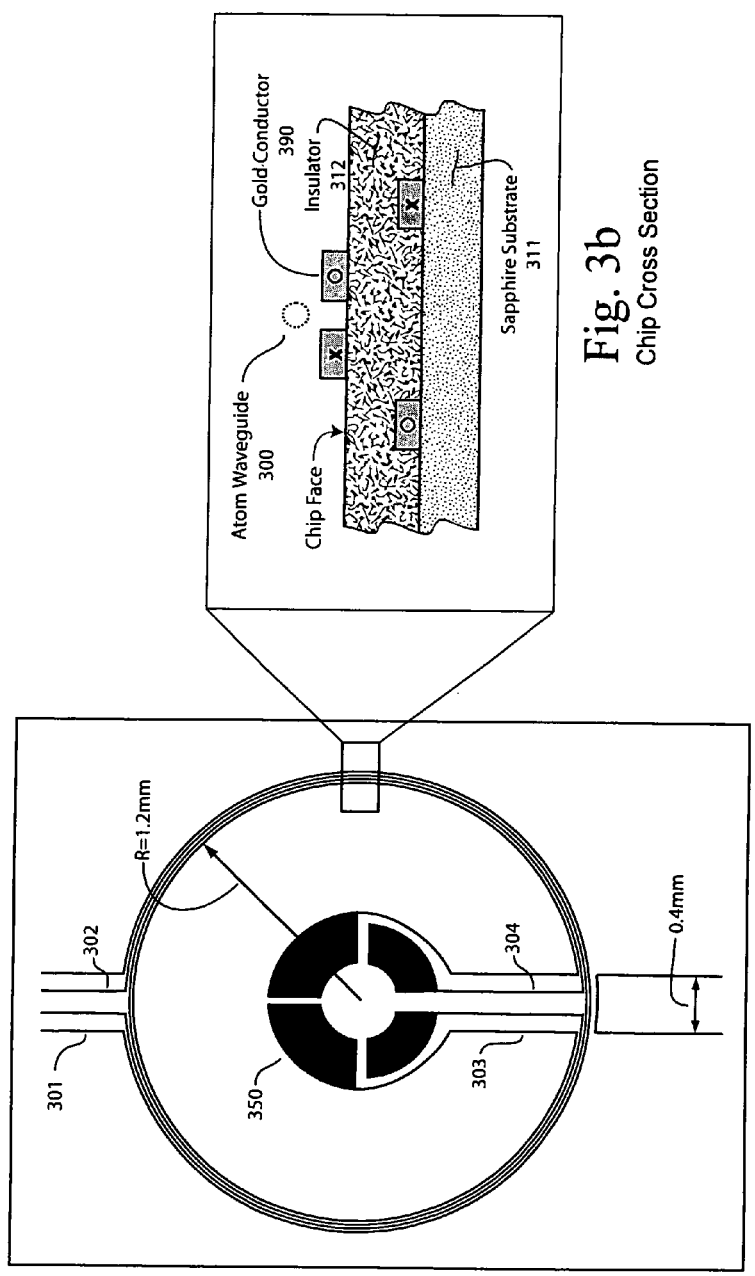

# US 7,030,370 B1

MICROCHIP RING TRAP FOR COLD ATOMS OR MOLECULES

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to interferometry and more specifically to a symmetric circular magnetic waveguide for cold neutral atoms using current carrying wires on a microchip. The waveguide is ideal to make an ultra-sensitive gyroscope using atom interferometry and the Sagnac effect. Either cold thermal atoms, quantum degenerate gasses (e.g. Bose-Einstein condensates, BECs), or molecules with a magnetic dipole moment may be used. This technology can also be used in general inertial force sensing (accelerometers, gravimeters), atomic clocks, electromagnetic field sensing, and quantum computing.

Important background to the present invention is found in the following U.S. patents of interest that are incorporated herein by reference are:

U.S. Pat. No. 6,476,383 Esslinger, et al. Nov. 5, 2002 entitled Device and method for generating and manipulating coherent matter waves; and U.S. Pat. No. 4,874,942 Clauser Oct. 17, 1989 entitled Rotation, acceleration, and gravity sensors using quantum-mechanical matter-wave interferometry with neutral atoms and molecules.

Patent No. 03761721 Altshuler Sep. 25, 1973 entitled Matter wave interferometric apparatus.

The Esslinger and Clauser references are of interest in that they set forth how a neutral atom (and/or molecule) matter-wave interferometer (and/or set of interferometers) can be used as an inertial sensor with a sensitivity exceeding that of conventional mechanical sensors and multiple circuit optical interferometers (including ring lasers) by many powers of ten. An interferometer in which matter-wave propagation beam paths enclose a finite area will sense rotations via the Sagnac effect. One with the paths displaced from each other will sense acceleration plus gravity. The matter-wave energy and mass dependence of the phase shifts that are due to rotation and acceleration are different. Thus a pair of interferometers with different energies and/or masses can perform simultaneous independent measurements of rotation and acceleration.

Atom interferometry with cold neutral atoms (<1 mK) promises to revolutionize the field of inertial force sensing. DeBroglie wave interferometers using cold neutral atoms have already produced state of the art clocks, gyroscopes, accelerometers, and field sensors since the invention of laser cooling and trapping and the Magneto-Optical Trap (MOT) in the 1980's. In general, these devices have been made in free space (i.e. the atoms are not trapped) and have very large power, space, and weight requirements. The growing field of atom interferometry on a microchip, with the creation of BEC on a microchip in 2001 (See Hansel et al, Nature v. 413 p. 498), gives hope that one can make a sensor with all the advantages of cold atoms without the large power dissipation and volume/weight requirements. These microchip devices use captive atoms with a magnetic dipole moment which are trapped by magnetic field gradients produced by currents on the microchip.

SUMMARY OF THE INVENTION

The present invention is a symmetric circular magnetic waveguide for cold neutral atoms using current carrying wires on a microchip.

The invention consists of a particular multi-layer layout of wires on a microchip. These conductive wires may be produced by photolithography on a substrate (e.g. gold on sapphire). There are four wires crucial to the design, essentially a pair of "two-wire waveguides". These wires are laid out on concentric circles with the inner and outer most wires on lower level of the chip, and the middle pair of wires on the top layer (the chip surface).

DESCRIPTION OF THE DRAWINGS

FIGS. 3a and 3b are further views of the chip design.

DETAILED DESCRIPTION OF THE PREFERRED EMBODIMENT

The present invention includes a symmetric circular magnetic waveguide for cold neutral atoms using current carrying wires on a microchip. This design is similar to Chapman et al PRL 2001 87.270401 but on a microchip. The waveguide is ideal to make an ultra-sensitive gyroscope using atom interferometry and the Sagnac effect. Either cold thermal atoms or quantum degenerate gasses (e.g. Bose-Einstein condensates, BECs) may be used. This technology can also be used in general inertial force sensing (accelerometers, gravimeters), atomic clocks, electromagnetic field sensing, and quantum computing.

The invention consists of a particular multi-layer layout of wires on a microchip. These conductive wires may be produced by photolithography on a substrate (e.g. gold on sapphire). There are four wires crucial to the design, see FIG. 1 below, essentially a pair of "two-wire waveguides". These wires are laid out on concentric circles with the inner and outer most wires on the lower level of the chip, and the middle pair of wires on the top layer (the chip surface).

In the diagram above, we show a symmetric minimum which is achieved by having the two two-wire waveguides at 90 degrees with respect to each other and at 45 degrees with respect to the chip normal vector with the wires in the bottom layer running approximately 3 times the current of the wires in the upper layer. More complex (asymmetric) minima can be achieved by varying this angle and these currents. One can use this waveguide for cold thermal (i.e. non-degenerate) atoms as is or for a BEC by applying one of the following methods to reduce Majorana transitions. Either apply an azimuthal bias field in the form of an axial wire in the center of the chip (forces the geometry to be purely circular), or adjusting the currents in the wires to make a time-averaged orbiting potential (move the minimum in a circle, e.g. Arnold A S 2003 J. Phys. B. 37 L29–L33). The circular minimum (waveguide) is the same in both strength, shape, and position under the following conditions: the two wires on the inside are energized; the two wires on the outside are energized; all four wires are energized (at half the currents of the previous cases); any situation in between adjusting the currents appropriately. Thus, it is possible to create a circular guide without ever crossing a lead that would lead to spurious phase shifts, by switching the guide from one two-wire pair to the other (see FIG. 2). Essentially there are two circular waveguides. As the atoms travel along one, they are slowly switched to the other track without any or only minor perturbations. This allows the inhomogeneities due to the leads to be moved to have the least affect on the atoms or particles.

Figure 1:
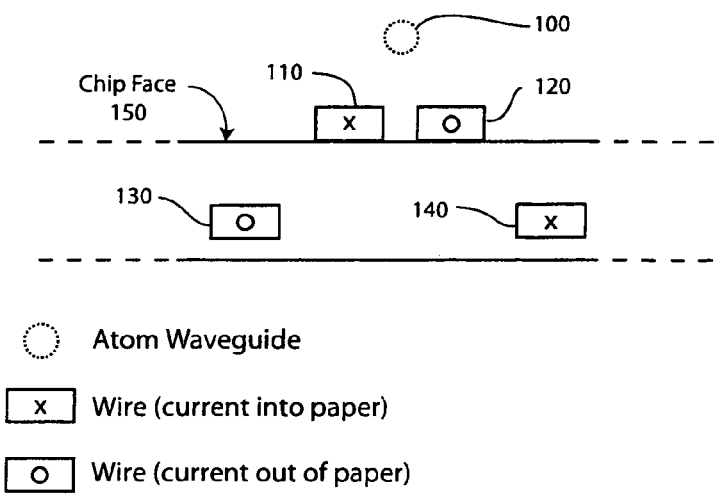
FIG. 1 is a cross-section view of the four-wire layout.
Figure 2:
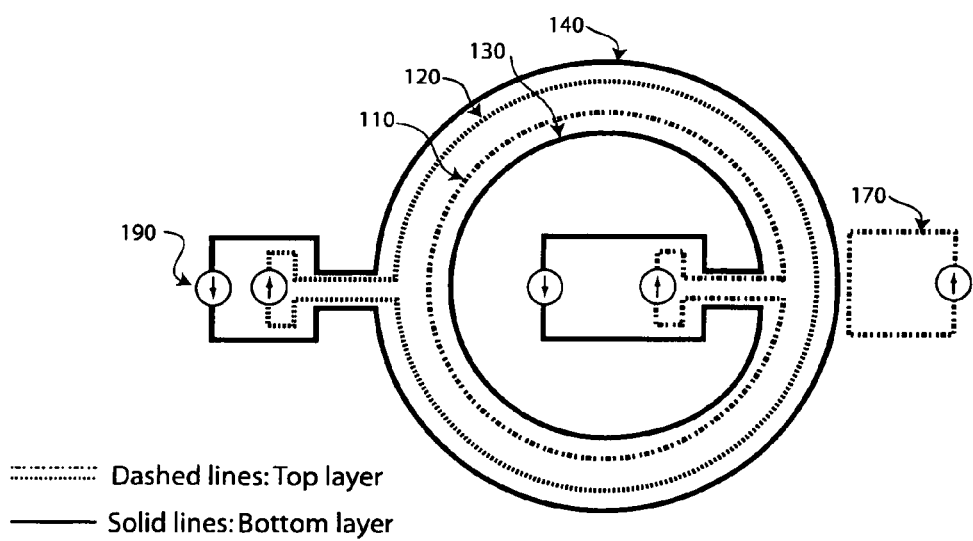
FIG. 2 is a view from above the top of the chip showing both wire guides.

FIG. 1 shows the basic elements of the invention. It has the atom waveguide 100 conducting cold atoms and molecules over the chip 150. The first two-wire waveguide 110 and 130 form a first interior circle with a radius of curvature of about 1.5 mm. The second two-wire waveguide 120 and 140 form a second circle concentric with the first circle. In the figure, the wires are 10 microns wide by 5 microns deep, the top wires are separated by 5 microns, the bottom wires by 35 microns, and the top to bottom are vertically separated by 10 microns. This produces two two-wire guides that form a minimum at the intersection of two lines drawn along the wire normal, at 7.5 microns above the chip surface (i.e. one line drawn through wires 110, 130 and another line drawn through wires 120, 140). FIG. 2 shows a top view of this layout together with the power sources 190 and direction of the currents in the wires.

It is important to note that it is the concept and geometery that are important not the specific scale. For example, the design is easily generalized to include different wire sizes and shapes, different overall scale, and different spacing between the wires. The power source 190 produces a 1–2 amp direct current where the voltage is determined by the resistance of the wires.

This wire layout includes 15 micron vertical separation and a 5 micron space representing a difference in the concentric radius, and this allows a completely circular on-chip Sagnac interferometer that doesn't suffer from defects due to crossing wire leads. It is versatile and adaptable for use with Bose-Einstein condensates or non-degenerate cold atoms. The traps can be exceedingly strong (up to 20 T/m$^2$ or 10 MHz for $^{87}$Rb for reasonable parameters). The atoms can be initially captured and cooled in situ by using a U-shape quadrupole trap or evaporative cooled in a Z-shape Ioffe-Pritchard trap. This is accomplished simply by either the addition of an extra wire 170 or taking advantage of the leads to one of the circular waveguides (see FIG. 2). The center of the chip (inside the circular guides) there is a hole to allow access to the leads of the inner guide and allow for an axial pin for a bias field. This need not be a hole if contacts can be grown through the substrate to the back of the chip.

There are two known ways to prevent losses from spin flip at a zero in the magnetic field. Each way creates a variation on the microchip design. [Arnold A S 2003 J. Phys. B. 37 L29–L33]

Alternative #1: Use an axial current in a wire centered on the chip and perpendicular to the chip surface to create a constant non-zero magnetic field along the length of the trap.

Alternative #2: Instead of using an axial wire, add a time dependent oscillation in the current of the wires to create an orbiting potential term in the magnetic field. This keeps the zero of the magnetic field in motion so that atoms or molecules that are attracted to the zero in the field rarely encounter it. Besides these alternatives, it is expected that some of the basic microchips traps, such as 'U' and 'Z' traps would also be designed on the chip depending on the specific application.

As mentioned above, the present trap uses the magnetic dipole moment of atoms or particles and a magnetic field gradient for trapping.

FIGS. 3a and 3b respectively show the two two-wire waveguide chip design with FIG. 3b a chip cross section from FIG. 3a.

The two electrodes 301 and 302 from the top of FIG. 3a are the outer ring electrodes and electrodes 303 and 304 are the inner electrodes, which are all supplied with current from the chip electronics 350.

FIG. 3b shows the sapphire Subtotal 311 insulator 312 and gold conductor of the wire waveguides 390 beneath the atom waveguide 300 with the basic layout of FIG. 1.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A microchip ring trap for cold neutral atom and molecules comprising:
   a microchip which has a substrate with a top chip face;
   current carrying wires to produce an atom waveguide for cold atoms and molecules in a path over the top chip face of the microchip;
   a first two-wire circular interior waveguide on the chip which creates a first ring wave guide above the chip;
   a second two wire circular exterior waveguide within the microchip which forms a second circle that is concentric and spatially coincidental and overlapped with the first ring wave guide; and
   a means for providing a current to the first and second two-wire waveguides so that they operate as a ring trap for cold atoms and molecules in the atom waveguide.

2. A microchip ring trap as defined in claim 1, wherein said first and second two-wire waveguides are each composed of wires that are composed of current conducting metals, and wherein said first circle has a diameter that is smaller than a diameter of the second circle.

3. A microchip ring trap as defined in claim 2, wherein said microchip which has a substrate with a top chip face made from sapphire and wherein said first and second two wire waveguides are each composed of 50 micron cross section gold wires.

4. A microchip ring trap as defined in claim 1, wherein said microchip which has a substrate with a top chip face made from insulating material and wherein said first and second two wire waveguides are each composed of conducting material (e.g. gold) wires.

5. A microchip ring trap as defined in claim 1, wherein said first and second two wire waveguides are separated from each other by a vertical separation of fifteen microns in said substrate.

6. A microchip ring trap as defined in claim 1 wherein said current providing means comprises a direct current source that proves a current that is adjustable between 0.5 and 3 amps to said first and second two-wire waveguides.

* * * * *